US012710605B2

(12) United States Patent
Gurgov et al.

(10) Patent No.: US 12,710,605 B2
(45) Date of Patent: Aug. 18, 2026

(54) METHODS FOR ALIGNING AN OPTICAL CONNECTOR WITH AN OPTICAL COMPONENT

(71) Applicant: Mellanox Technologes, Ltd., Yokneam (IL)

(72) Inventors: Hassid C. Gurgov, Binyamina (IL); Santiago Echeverri, Copenhagen (DK); Dimitrios Kalavrouziotis, Papagou (GR); Elad Mentovich, Tel Aviv (IL)

(73) Assignee: Mellanox Technologies, Ltd., Yokneam (IL)

( * ) Notice: Subject to any disclaimer, the term of this patent is extended or adjusted under 35 U.S.C. 154(b) by 317 days.

(21) Appl. No.: 18/403,928

(22) Filed: Jan. 4, 2024

(65) Prior Publication Data

US 2025/0189734 A1 Jun. 12, 2025

(30) Foreign Application Priority Data

Dec. 7, 2023 (GR) .............................. 20230101010

(51) Int. Cl.
*G02B 6/42* (2006.01)

(52) U.S. Cl.
CPC ......... *G02B 6/4227* (2013.01); *G02B 6/4226* (2013.01)

(58) Field of Classification Search
CPC ............................ G02B 6/4227; G02B 6/4226
USPC ............................................................ 385/52
See application file for complete search history.

(56) References Cited

U.S. PATENT DOCUMENTS

| | | | |
|---|---|---|---|
| 10,241,269 B1 * | 3/2019 | Jacob | G02B 6/124 |
| 11,789,203 B2 | 10/2023 | Kalavrouziotis et al. | |
| 11,817,904 B2 | 11/2023 | Nielsen et al. | |
| 2010/0014807 A1 * | 1/2010 | Shin | G02B 6/32 359/639 |
| 2011/0149365 A1 * | 6/2011 | Cho | H01S 5/02438 359/578 |
| 2019/0339515 A1 * | 11/2019 | Thakur | G02B 6/0023 |
| 2022/0099891 A1 | 3/2022 | Luff et al. | |
| 2022/0276452 A1 | 9/2022 | Freedman et al. | |
| 2022/0276455 A1 | 9/2022 | Rubinstein et al. | |

(Continued)

OTHER PUBLICATIONS

Rudnick et al., Pending U.S. Appl. No. 18/119,630, filed Mar. 9, 2023.

(Continued)

*Primary Examiner* — Jerry M Blevins
(74) *Attorney, Agent, or Firm* — Alston & Bird LLP

(57) ABSTRACT

Methods and devices are provided for aligning an optical connector with an optical component, such as a photonic integrated circuit (PIC). An example method includes providing an optical component comprising at least one optical port on a surface of the optical component, where the optical component includes a first correction device and a second correction device. The method further includes aligning an optical connector with the first correction device to achieve a first positional setting of the optical connector. The method may include aligning the optical connector with the second correction device to achieve a second positional setting of the optical connector. The optical connector may be moved a predefined distance while maintaining the first and second positional settings to bring the optical connector into an operative position with respect to the at least one optical port.

20 Claims, 6 Drawing Sheets

(56) References Cited

U.S. PATENT DOCUMENTS

2022/0365293 A1 11/2022 Kalavrouziotis et al.
2025/0172766 A1* 5/2025 Huang .................... G02B 6/30

OTHER PUBLICATIONS

Gurgov et al., Pending U.S. Appl. No. 18/372,750, filed Sep. 26, 2023.
Gurgov et al., Pending U.S. Appl. No. 18/371,485, filed Sep. 22, 2023.

* cited by examiner 102
406
l
402
208
400A 102
406
l
402
400B

METHODS FOR ALIGNING AN OPTICAL CONNECTOR WITH AN OPTICAL COMPONENT

CROSS-REFERENCE TO RELATED APPLICATIONS

This application claims priority to Greek patent application No. 20230101010, filed Dec. 7, 2023, the entire contents of which application are hereby incorporated herein by reference.

TECHNOLOGICAL FIELD

Example embodiments of the present disclosure relate generally to aligning an optical connector with an optical component, such as a photonic integrated circuit (PIC).

BACKGROUND

Fiber optic communication permits the transmission of data over longer distances and at higher data transfer rates (bandwidths) than electrical cables. The data is transmitted in the form of optical signals over optical fibers, and optical connectors are used to connect the optical fibers (often bundled in cables) to other optical components. A photonic integrated circuit (PIC) is a microchip that includes two or more photonic components that form a functioning circuit to detect, generate, transport, and process light. In fiber optic networks, optical connectors may be optically coupled to optical components, such as PICs, and the alignment of the optical connector to the optical component can influence the strength of the connection and the quality of the signal. Applicant has identified numerous deficiencies and problems associated with conventional methods for creating connections between optical fibers and optical components, such as PIC-to-optical fiber connections. Through applied effort, ingenuity, and innovation, many of these identified problems have been solved by developing solutions that are included in embodiments of the present disclosure, many examples of which are described in detail herein.

BRIEF SUMMARY

Embodiments of the present disclosure are directed to aligning an optical connector with an optical component. In some embodiments, an optical component comprising at least one optical port on a surface of the optical component may comprise a first correction device and a second correction device. Aligning the optical connector with the first correction device may achieve a first positional setting of the optical connector. Aligning the optical connector with the second correction device may achieve a second positional setting of the optical connector. Moving the optical connector a predefined distance while maintaining the first and second positional settings may bring the optical connector into an operative position with respect to the at least one optical port.

In some embodiments, the first positional setting of the optical connector may be a tilt of the optical connector.

In some embodiments, the second positional setting of the optical connector may be a lateral position of the optical connector.

In some embodiments, the predefined distance may be a distance between the second correction device and the at least one optical port.

In some embodiments, the first correction device may comprise a grating formed in the surface of the optical component.

In some embodiments, the grating may define a grating period, and the grating period may be based on the wavelength of a collimated light beam used to align the optical connector with the first correction device.

In some embodiments, the grating may define one of a square pattern, a sloped sawtooth pattern, or a sine wave pattern.

In some embodiments, the grating may be configured to have a larger area than an area of the at least one optical port.

In some embodiments, the second correction device may comprise a grating formed in the surface of the optical component.

The grating may define a period based on the wavelength of a collimated light beam used to align the optical connector with the second correction device.

In some embodiments, the grating may be configured to match a configuration of the at least one optical port, such that centering the optical fiber of the optical connector with respect to the second correction device corresponds to centering the optical fiber of the optical connector with respect to the at least one optical port.

In some embodiments, the optical connector may comprise an array of optical fibers.

In some embodiments, the at least one optical port may be a first optical port, the optical component further comprising a second optical port spaced from the first optical port. Each of the first optical port and the second optical port may be associated with a first correction device and a second correction device. The optical fiber of the optical connector may be a first optical fiber, and the optical connector further comprises a second optical fiber. Aligning the optical connector with the first correction device may comprise aligning the first optical fiber with the first correction device associated with the first optical port to achieve a first positional setting of the first optical fiber and aligning the second optical fiber with the first correction device associated with the second optical port to achieve a first optional setting of the second optical fiber. Aligning the optical connector with the second correction device may comprise aligning the first optical fiber with the second correction device associated with the first optical port to achieve a second positional setting of the first optical fiber and aligning the second optical fiber with the second correction device associated with the second optical port to achieve a second positional setting of the second optical fiber. Moving the optical connector a predefined distance while maintaining the first and second positional settings for the first and second optical fibers of the optical connector to bring the optical connector into an operative position that is optimized with respect to the first and second optical ports.

An optical component according to some aspects is also provided. The optical component may comprise at least one optical port configured to receive an optical signal from an optical fiber of an optical connector. The optical component may comprise a first correction device, the first correction device may be configured to align the optical fiber of the optical connector to achieve a first positional setting of the optical connector. The optical component may comprise a second correction device, the second correction device may be configured to align the optical fiber of the optical connector to achieve a second positional setting of the optical connector. Movement of the optical connector by a predetermined distance while maintaining the first and second positional settings serves to align the optical fiber of the optical connector with the at least one optical port.

In some embodiments, the first correction device may be spaced from the second correction device.

In some embodiments, the at least one optical port may be disposed between the first correction device and the second correction device.

In some embodiments, the at least one optical port may be disposed between the first correction device and the second correction device.

In some embodiments, the optical component may comprise multiple optical ports, each port may be associated with a first correction device and a second correction device.

In some embodiments, the first correction device may comprise a grating formed in the surface of the optical component, the grating may define one of a square pattern, a sloped sawtooth pattern, or a sine wave pattern.

In some embodiments, the grating may be configured to have a larger area than an area of the at least on optical port.

In some embodiments, the second correction device may comprise a grating formed in the surface of the optical component, the grating may be configured to match a configuration of the at least one optical port, such that centering the optical fiber of the optical connector with respect to the second correction device corresponds to centering the optical fiber of the optical connector with respect to the at least one optical port.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1A:
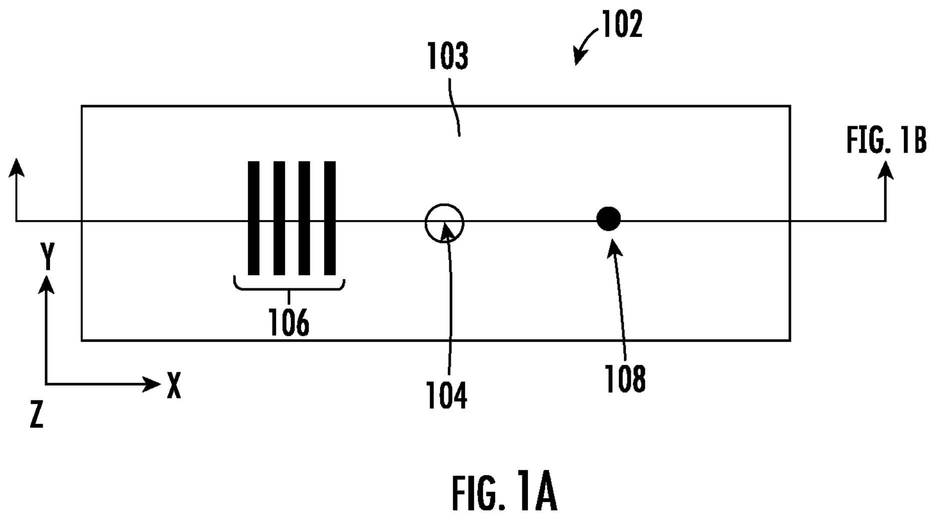
FIG. 1A is a top plan view of a photonic integrated circuit (PIC) with a first and second correction device in accordance with some embodiments described herein.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

An optical fiber is a flexible, transparent fiber made by drawing glass or plastic to a compressed diameter. Optical fibers may be used for telecommunications, long distance transmissions, power transmissions, light transmissions, sensor applications, and computer networking. An optical fiber may include a core surrounded by a cladding material with a lower index of refraction. In some cases, an optical fiber may include a cylindrical dielectric waveguide that transmits light along its axis through a process of total internal reflection. Materials used in the creation of optical fibers may include silica, fluorozirconate (fluoride glass), fluoroaluminate, chalcogenide glasses, crystalline materials, and/or a combination of such materials.

An optical connector may refer to a device formed or attached to the end of at least one optical fiber that is used to connect the optical fiber to an optical component, such as a photonic integrated circuit (PIC), in order to house, contain, store, and/or enable connections between at least one optical fiber and the optical component. The optical connector may be a single fiber or multiple fibers. In some cases, the outer portion of the optical connector (e.g., an outer surface of the optical fiber) may comprise a material that is the same or similar to the material(s) of the surface of the optical component regardless of the configuration of the optical component.

An optical component as described herein, to which the optical connector may be connected, may refer to an optoelectronic device with at least one optical port capable of accepting an optical connector. Although the descriptions and explanations below and the accompanying figures refer to a PIC as the optical component for ease of explanation, embodiments of the invention contemplate and may be used in connection with various types of optical components. Examples of optical components described herein may, for example, include a PIC, a photodetector array (PD-array), a vertical surface emitting laser (VCSEL), or an arrayed surface-emitting/receiving device. An optical component may connect, house, and/or communicate with the optical connector and the optical fibers therein.

A PIC may refer to a microchip comprising at least two or more photonic components that form a functioning circuit.

In general, photonic components are capable of processing light and may be used to detect, generate, and/or transport light within the PIC and components connected to the PIC. PICs may include materials such as silicone, silicon nitride, silicon photonics, silica, lithium niobate, indium phosphide, and/or gallium arsenide. PICs may be attached to an optical fiber of an optical connector through an array of optical ports disposed on the surface of the PIC. In some cases, an optical port may accept beams of collimated light (e.g., light having minimal spread as it propagates, as described in greater detail below) from an optical fiber of an optical connector. To effect a more efficient coupling of a PIC with an optical connector (e.g., between an optical port and an optical fiber), the optical connector should be properly aligned with the PIC with respect to a rotational position and a lateral position of the optical connector relative to the PIC so as to allow light to be transmitted between a given optical fiber and a corresponding optical port. Achieving more accurate alignment thus serves to center the beams of light from the optical fiber with respect to the corresponding optical port on the surface of the PIC into which the light is directed.

As noted above, a collimated light beam may refer to a beam of light or other electromagnetic radiation with parallel or approximately parallel rays. In general, collimated beams of light may not disperse to the same extent as an uncollimated beam of light (e.g., the collimated beam of light exhibits little to no divergence compared to a beam of uncollimated light). Although a perfectly collimated beam of light may not disperse with distance, diffraction may prevent the formation of a perfectly collimated beam. Thus, while it is understood that a collimated light beam in practice may not have perfectly parallel rays, the phrase "collimated light beam" as used herein may refer to a light beam that has an approximation of parallel rays. A collimated light beam may further have an associated wavelength, which may be held constant or may be adjusted throughout the alignment process.

Attachment or coupling of an optical fiber to an optical component may be performed across multiple fields and industries involving technologies associated with optical communication, optical sensors, and quantum computing. Optical connectors may comprise an array of optical fibers that is attached to an optical component so as to direct light from an optical fiber into a corresponding optical port on the surface of the optical component to enable communication between the optical fiber(s) and the optical component. The connection between an optical component and an optical connector may be accomplished after alignment of the components through a subsequent bonding or other attachment process. The precision and accuracy of the alignment of the at least one optical fiber of the optical connector with the optical port of the optical component may alter the strength and the communications capabilities between the optical component and the optical fiber, as will be understood by one skilled in the art in light of this disclosure.

Coupling of an optical component and an optical connector may be highly sensitive to misalignments. For example, as collimated light has parallel rays and minimal spread, if an optical fiber is not properly aligned with a corresponding optical port, the ability to function and/or efficiently communicate with the optical component may be compromised. Alignment of the optical component and the optical connector may further be complicated by the difficulty in obtaining feedback on the alignment during the coupling process. Simultaneous alignment with respect to at least four degrees of freedom (e.g., two degrees associated with tilt and two degrees associated with lateral position) may need to be achieved to form robust connections between the optical ports of the optical component and the optical fibers of the optical connector. Conventional methods for coupling an optical component with an optical connector, however, may not adequately address possible changes that may occur in the orientation of the optical connector with respect to the optical component during the attachment process.

In order to address these issues and others, embodiments of the present invention are directed to aligning an optical connector with an optical component. In particular, embodiments of the devices and methods described herein provide for alignment of an optical port of the optical component with respect to a corresponding optical fiber of an optical connector through separate and consecutive alignments, thereby circumventing problems arising from misaligned coupling and placement sensitivity. According to embodiments of the present invention, the alignment of an optical fiber of the optical connector with a corresponding optical port of the optical component may be achieved through pre-determination and pre-setting of degrees of freedom using correction devices formed directly on the optical component. As described in greater detail below, embodiments of the alignment method may be used in the coupling of optical components with optical connectors to promote strong, directionally aligned bonds and enhance communication between optical components.

Figure 1B:
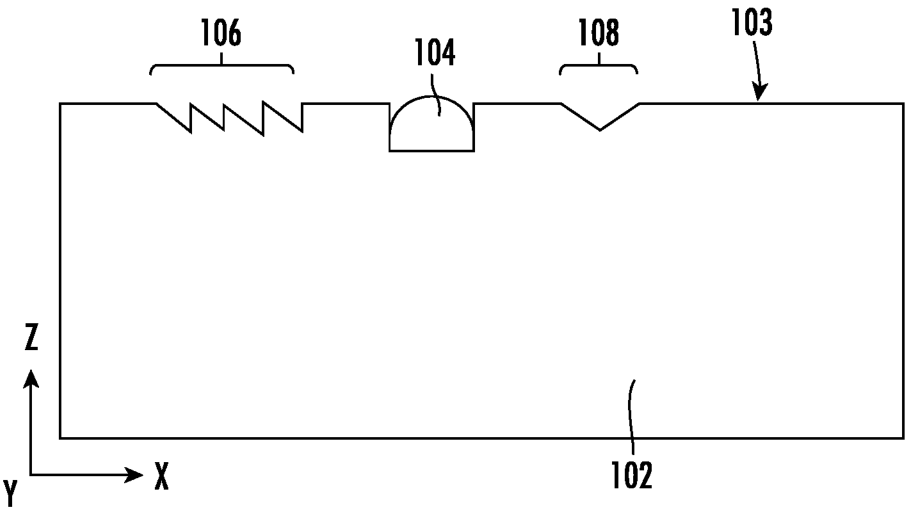
FIG. 1B is cross-sectional side view of the PIC of FIG. 1A in accordance with some embodiments described herein.

With reference to FIG. 1A and FIG. 1B, a top view and a cross-sectional side view of an optical component in the form of a PIC 102 are illustrated respectively according to some embodiments. The PIC 102 may comprise at least one optical port 104, a first correction device 106, and a second correction device 108. The first correction device 106 may be spaced from the second correction device 108 on the surface 103 of the PIC 102. For instance, the optical port 104 may be disposed between the first correction device 106 and the second correction device 108 (e.g., in a region between the first correction device and the second correction device). In some embodiments, as depicted, the first correction device 106 and the second correction device 108 may be disposed on opposite sides of the at least one optical port 104. As will be understood by one skilled in the art in the light of this disclosure, the at least one optical port 104 may be configured to receive an optical signal from an optical fiber of an optical connector 202 (shown in FIGS. 2 and 3). For example, the optical port 104 may be configured to receive collimated light and to optically communicate with the optical connector 202 based on the alignment between the optical connector and the optical port 204, as described in greater detail below. In this regard, the first correction device 106 may be configured to align the optical fiber 204 of the optical connector 202 to achieve a first positional setting of the optical connector. The second correction device 108 may be configured to align the optical fiber 204 of the optical connector 202 to achieve a second positional setting of the optical connector.

Figure 2:
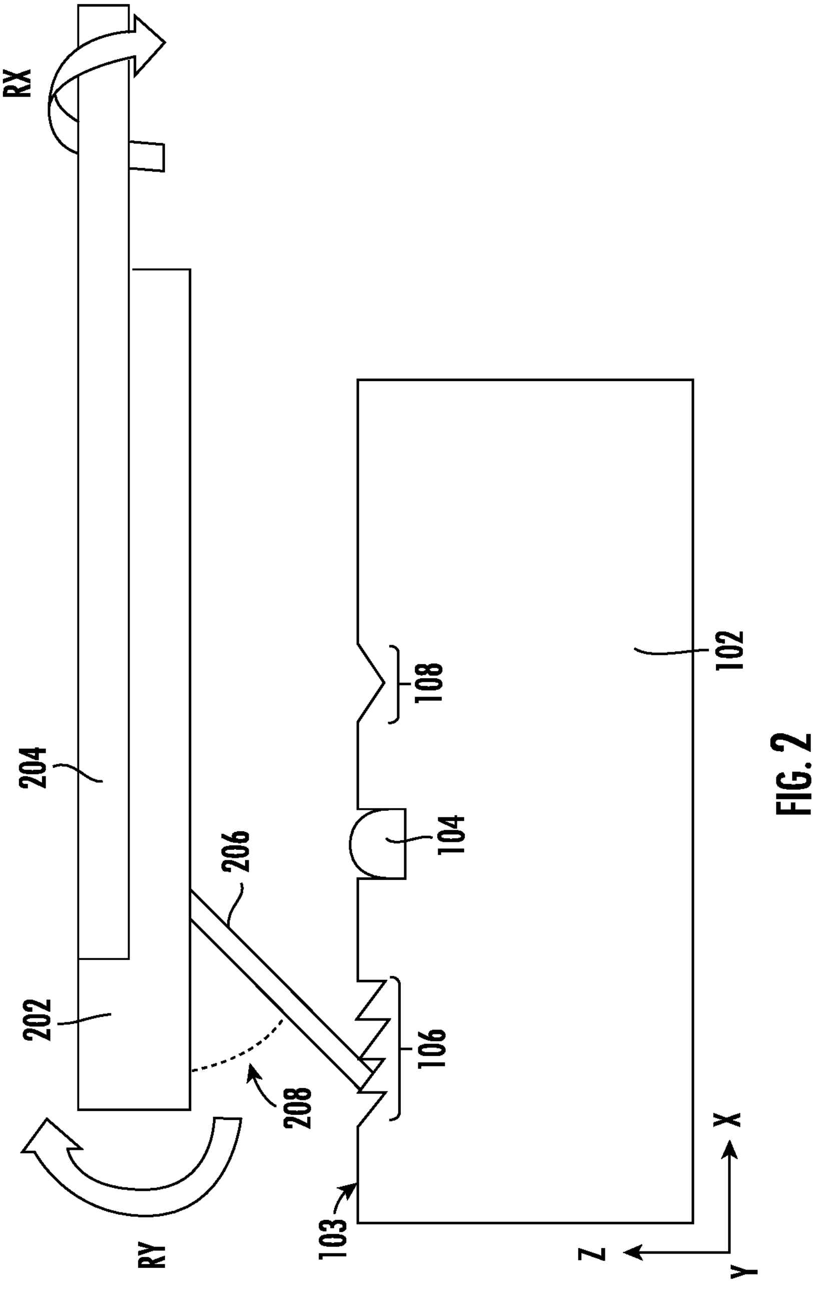
FIG. 2 illustrates alignment of an optical connector with the PIC to obtain a first positional setting via the first correction device in accordance with some embodiments described herein.

With reference to FIG. 2, the first positional setting of the optical connector 202 may be a tilt of the optical connecter in relation to the PIC 102 and, more specifically, to the optical port 104 on the surface of the PIC with which an optical fiber of the optical connector will be optically coupled. The "tilt" may refer to the rotational position of the optical connector 202 about an X axis (e.g., a first rotational position RX representing one degree of freedom) and about a Y axis (e.g., a second rotational position RY representing a second degree of freedom). In other words, determining the first positional setting of the optical connector 202 may involve adjusting the first rotational position RX and the second rotational position RY to achieve an optimal incidence of the light beam 206 upon the first correction device 106, the optimal incidence being the incidence of the light beam 206 onto the first correction device 106 that achieves a maximum power input of the light into the corresponding optical port to which the optical fiber will be coupled.

As such, in some cases, the first correction device 106 may comprise a grating fabricated or formed in the surface 103 of the PIC 102. The grating may be defined, etched, stamped, cut, or otherwise formed on the surface 103 of the PIC 102. The location and dimensions of the grating associated with the first correction device 106 may be configured (e.g., sized and shaped) to enable alignment of the optical fiber 204 with the optical port 104, once the optical connector 202 is subsequently moved into position with the optical port as described below. In other words, the first correction device 106 may be configured such that once the first positional setting (RX, RY) is determined using the first correction device 106, the first positional setting for achieving optimal incidence with respect to the optical port 104 is also determined because it is the same.

In this regard, the grating may define a grating period based on the wavelength of a light beam 206 (e.g., a collimated light beam) that is used during the alignment process. The period of the grating associated with the first correction device 106 may, for example, be adjusted based on the optimal incidence of the beam 206 with respect to the first correction device 106, as described in greater detail below. For instance, a collimated light beam 206 may be reflected by the grating of the first correction device 106 and received by a circulator circuit (not shown) configured to separate the outgoing light from incoming reflected light. The reflected light may be measured at the optical connector 202 to determine if the rotational position of the optical connector is such that the optimal incidence has been achieved. If, for example, the reflected light received at the optical connector 202 is less than a threshold level as compared to the emitted light, then the first positional setting (RX, RY) may need to be adjusted until the threshold level (e.g., the optimal incidence) is met (e.g., a greater amount of the light is reflected and reaches the optical connector). Alignment of the optical fiber 204 with the first correction device 106 may be achieved regardless of the lateral position of the optical fiber or the optical connector with respect to the optical port 104 of the PIC 102.

Accordingly, in some embodiments, the area of the first correction device 106 (e.g., the area of the grating) in the XY plane may be larger than the area of the at least one optical port 104 in the XY plane and larger than a cross-sectional area of the light beam 206 that is incident to the first correction device. The larger area may thus provide a greater tolerance for positioning the optical connector 202 laterally within the XY plane, as the light beam 206 will not need to be centered with respect to the first correction device 106 in order to allow the determination of the first positional setting.

Figure 3:
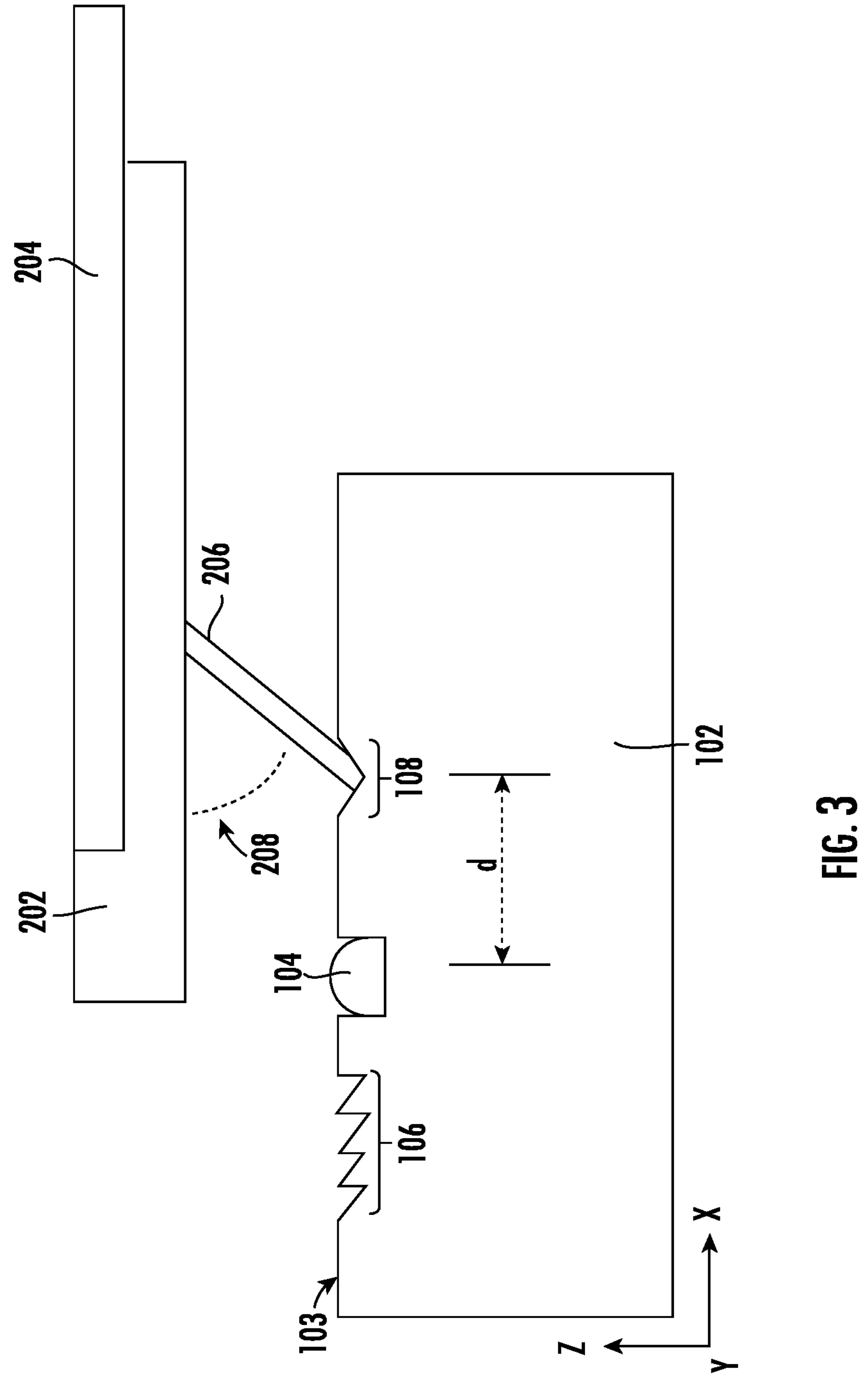
FIG. 3 illustrates alignment of an optical connector with the PIC to obtain a second positional setting via the second correction device in accordance with some embodiments described herein.

With reference now to FIGS. 1A-1B and FIG. 3, the optical fiber 204 of the optical connector 202 may next be positioned with respect to the second correction device 108 such that a second positional setting may be determined via the second correction device 108 in accordance with some embodiments described herein. The second positional setting of the optical connector 202 may be a lateral position of the optical connector along the X axis and along the Y axis that centers the light beam 206 with respect to a center of the second correction device 108. In this regard, the optical connector 202 may be moved along the X axis (one degree of freedom in the XY plane) and along the Y axis (another degree of freedom in the XY plane), while maintaining the first positional setting of the optical connector, until a position is achieved at which the collimated light beam 206 incident on the second correction device 108 is centered with respect to a center of the second correction device.

As such, in some embodiments, the second correction device 108 may comprise a grating formed in the surface of the PIC 102. The grating may, in some embodiments, be substantially identical to the grating defined in the first correction device 106 in order to achieve optimal incidence with respect to the light beam 206 incident on the second correction device. For instance, once the second positional setting (RX, RY) of the optical connector 202 has been achieved, the second correction device 108 may be configured such that the grating reflects the collimated light beam 206 at a maximum power of the light. The grating of the second correction device 108 may thus define a grating period based on the wavelength of the collimated light beam and the tilt at which the collimated light beam is emitted from the optical fiber 204 of the optical connector 202. The grating may therefore be configured to match a configuration of the at least one optical port 104, such that centering the optical fiber 204 of the optical connector 202 with respect to the second correction device 108 corresponds to centering the optical fiber of the optical connector with respect to the optical port.

In some embodiments, the second correction device 108 may define an area that is less than the area of the first correction device 106 and that may more closely approximate the area of the optical port 104 and the cross-sectional area of the light beam 206. In this way, an alignment of the light beam 206 with the second correction device 108 may be determined when a threshold cross-sectional area of the light beam incident on the second correction device is received. For example, perfect alignment (e.g., perfect centering) of the light beam 206 with respect to the second correction device 108 would be achieved in an instance in which the cross-sectional area of the light is less than or equal to the cross-sectional area of the second correction device, which corresponds to receipt of maximum reflected light.

Upon determining the second positional setting using the second correction device 108, the optical connector 202 may be moved to a coupling position with respect to the optical port 104 by moving the optical connector a predefined distance d while maintaining the first positional setting and the second positional setting. The predefined distance d may be the distance between a center of the second correction device 108 and a center of the at least one optical port 104 with which the optical fiber of the optical connector 202 is to be coupled. The predefined distance d may, for example, be a measurement of the distance along the X axis, while a position along the remaining two axes (e.g., the Y axis and the Z axis) is held constant. For example, the distance d (shown in FIG. 3) may be known due to the manufacturing specifications for forming the PIC, including the second correction device 108 and the optical port 104. Because the second positional setting of the optical connector 202 has been determined (e.g., the light beam 206 is centered with respect to the second correction device 108), and because a location of the center of the optical port 104 is known with respect to the center of the second correction device 108 (thereby defining the distance d), movement of the optical connector 202 by the predefined distance d may place the optical connector in an optimally operative position with the optical port 104 of the PIC 102. The optimally operative position may, in other words, enable coupling of the optical connector 202 with the PIC 102 in a way that achieves a more robust and direct optical connection for light to be transmitted between the optical fiber 204 and the optical port 104.

Figures 4A, 4B:
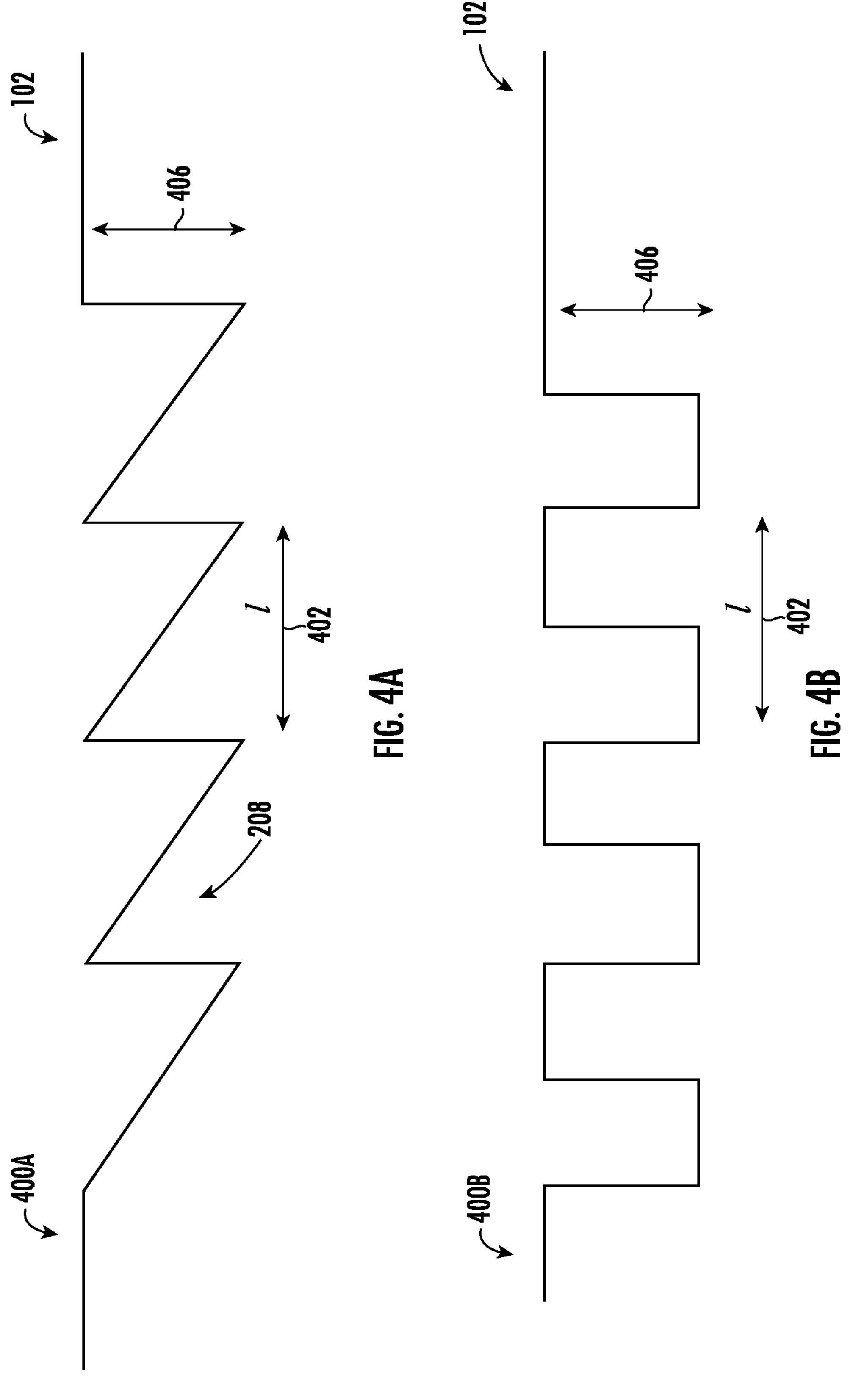
FIGS. 4A and 4B are schematic illustrations of gratings that may form the first and second correction devices in the surface of the PIC in accordance with some embodiments described herein.

With reference to FIGS. 4A and 4B and as noted above, each of the first and second correction devices 106, 108 may comprise a grating 400A, 400B formed on the surface of the PIC 102, where the grating defines a grating period 402. The grating period 402 may be a distance over which a single instance of a repeating pattern of the grating 400A, 400B is defined. In FIG. 4A, for example, the pattern is a sloped sawtooth pattern, whereas in FIG. 4B the pattern is a square pattern, as shown. In still other embodiments, the grating may be configured according to a sinusoidal wave pattern (not shown). In the embodiment shown in FIG. 4A, the grating period 402 of the sloped sawtooth pattern grating 400A may define a grating angle 208. In such embodiments, the length of the grating period 402 may be calculated using the following equation:

$$l = F * W/\sin(A)$$

In the equation shown above, W represents the wavelength of the collimated light beam 206, F is a scale factor, and A is the grating angle 208. The grating pattern forming the first correction device 106 and the second correction device 108 may comprise at least one grating period 402. Moreover, the grating depth 406 defined by the grating pattern may be determined based on the wavelength of the collimated light beam 206, the grating angle 208, and the length l of the period 402. For instance, the grating depth may be obtained using the following equation:

$$d = l/\tan(A)$$

In the equation above, d represents the grating depth 406, which may be calculated for the length l of the period 402 and A, where A represents the grating angle 208. Accordingly, if the optical fiber is aligned with the first correction device 106, the first correction device may be configured to reflect the collimated light beam 206 at an angle corresponding to the grating angle 208.

Figure 5:
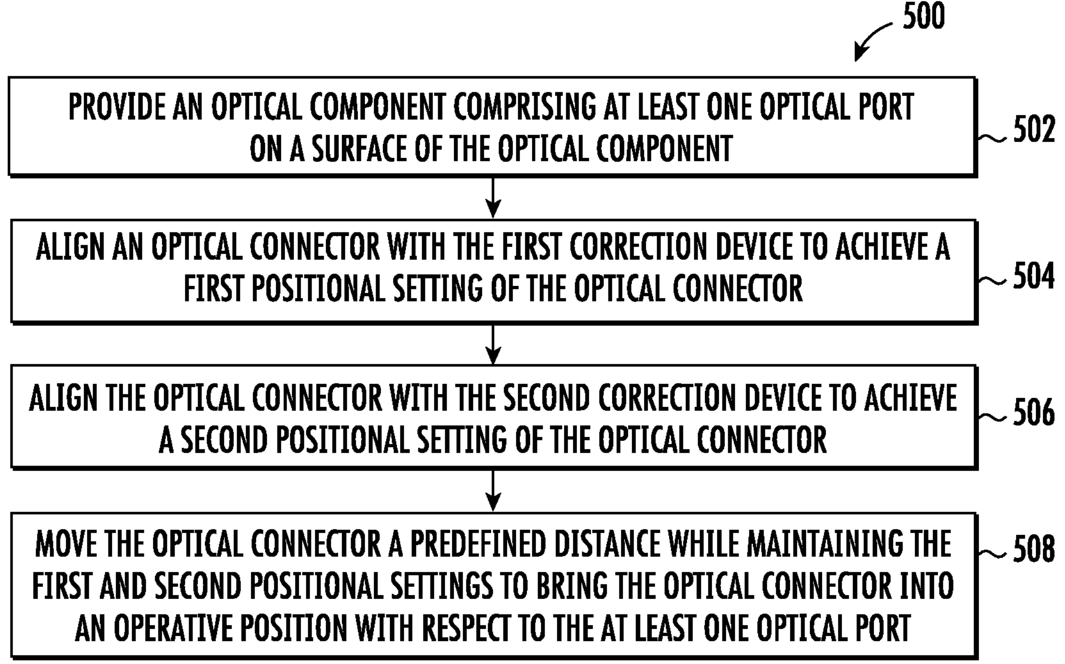
FIG. 5 is a process flow chart illustrating a method for aligning an optical connector with a PIC in accordance with some embodiments described herein.

Referring to FIG. 5, a method 500 of aligning an optical connector with an optical component is shown. The method may include providing an optical component comprising at least one optical port on a surface of the optical component, and the optical component may comprise a first correction device and a second correction device (Block 502). An optical fiber of an optical connector may be aligned with the first correction device to achieve a first positional setting of the optical connector (Block 504). In some cases, the first correction device may comprise a grating formed in the surface of the optical component configured to align the optical connector and the optical component to achieve a first positional setting. The first positional setting of the optical connector may, for example, be a tilt of the optical connector, as described above. The optical fiber may be aligned with the second correction device to achieve a second positional setting of the optical connector (Block 506). The second positional setting of the optical connector may be a lateral position of the optical connector, as described above. In some embodiments, the grating of the first correction device and the second correction device may define a grating period based on the wavelength of the collimated light beam and the grating angle. The optical connector may then be moved a predefined distance while maintaining the first and second positional settings to bring the optical connector into an operative position with respect to the at least one optical port (Block 508). The predefined distance may be a distance between the second correction device and the at least one optical port. The operative position may enable coupling of the optical fiber of the optical connector to the optical component.

Figure 6A:
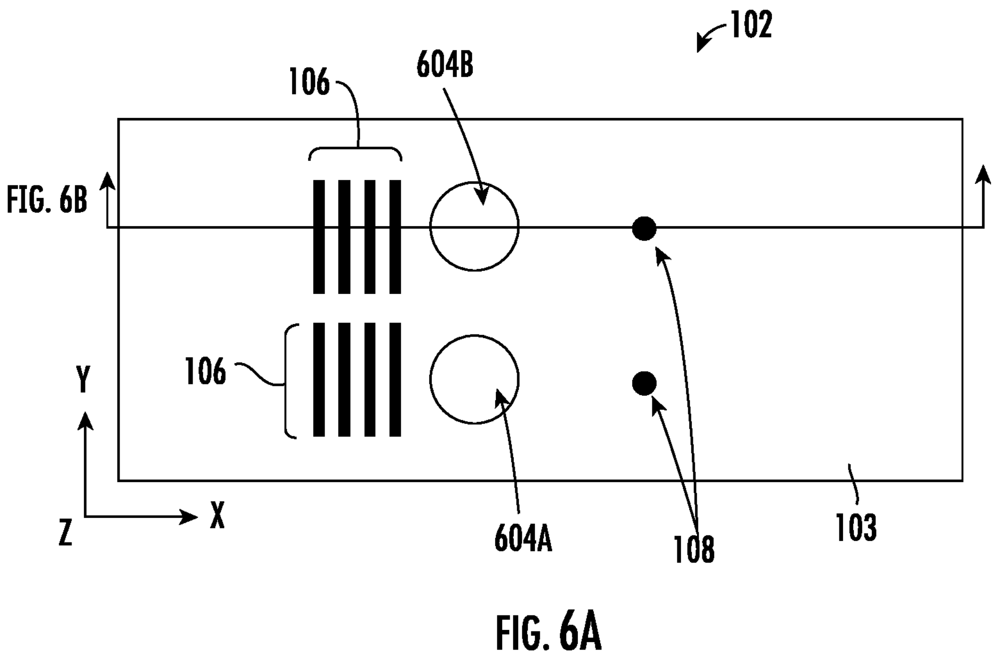
FIG. 6A is a top plan view of a PIC with a plurality of optical ports and corresponding first and second correction devices in accordance with some embodiments described herein.
Figure 6B:
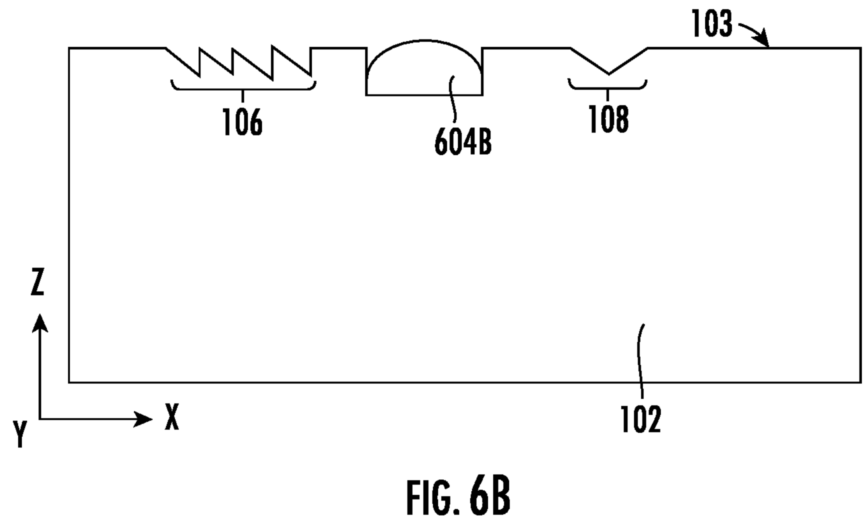
FIG. 6B is a cross-sectional side view of the PIC of FIG. 6A in accordance with some embodiments described herein.

Turning now to FIGS. 6A and 6B, in some embodiments, the optical component, which may be a PIC 102 as noted in the examples above, may comprise multiple optical ports, and each optical port may be associated with a first correction device and a second correction device. For example, the at least one optical port may, in some cases, be a first optical port 604A, and the PIC 102 may further comprise a second optical port 604B spaced from the first optical port, as shown in FIG. 6A. Each of the first optical port 604A and the second optical port 604B may be associated with a corresponding first correction device 106 and a second correction device 108. The optical fiber 204 of the optical connector 202 (shown in FIGS. 2 and 3) may comprise a first optical fiber, and the optical connector may further comprise a second optical fiber (e.g., the optical connector may comprise an array of optical fibers). As such, aligning the optical connector 202 with the first correction device 106 may comprise aligning the first optical fiber with the first correction device 106 associated with the first optical port 604A and aligning the second optical fiber with the first correction device 106 associated with the second optical port 604B to achieve the first positional setting of the optical connector 202.

Moreover, aligning the optical connector 202 with the second correction device 108 may comprise aligning the first optical fiber 204 with the second correction device associated with the first optical port 604A to achieve a second positional setting of the first optical fiber, and aligning the second optical fiber with the second correction device associated with the second optical port 604B to achieve a second positional setting of the second optical fiber. The optical connector may then be moved a predefined distance (d) while maintaining the first and second positional settings of the first and second optical fibers 204 to bring the optical connector 202 into an operative position with respect to the PIC 102. The operative position may be optimized with respect to the first and second optical ports 604A. 604B.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of any optical component or optoelectronic element. In addition, the methods described above may include fewer steps in some cases, while in other cases may include additional steps. For example, although the devices, systems, and methods described above refer to a first correction device for determining a first positional setting and a second correction device for determining a second positional setting, it is to be understood that the terms "first" and "second" are used for ease of reference, only. As such, in some embodiments, the second positional setting (e.g., a lateral position of the optical connector along the X axis and along the Y axis) may be determined first in time, and the first positional setting (e.g., a rotational position of the optical connector about the X axis and about the Y axis) may be determined second in time. As such, modifications to the steps of the method described above, in some cases, may be performed in any order and in any combination.

Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

That which is claimed:

1. A method comprising:

providing an optical component comprising at least one optical port on a surface of the optical component, wherein the optical component comprises a first correction device and a second correction device;

aligning an optical connector with the first correction device to achieve a first positional setting of the optical connector;

aligning the optical connector with the second correction device to achieve a second positional setting of the optical connector; and after achieving the first positional setting and the second positional setting, moving the optical connector a predefined distance while maintaining the first and second positional settings to bring the optical connector into an operative position with respect to the at least one optical port.

2. The method of claim 1, wherein the first positional setting of the optical connector is a tilt of the optical connector.

3. The method of claim 1, wherein the second positional setting of the optical connector is a lateral position of the optical connector.

4. The method of claim 1, wherein the predefined distance is a distance between the second correction device and the at least one optical port.

5. The method of claim 1, wherein the first correction device comprises a grating formed in the surface of the optical component.

6. The method of claim 5, wherein the grating defines a grating period, and wherein the grating period is based on the wavelength of a collimated light beam used to align the optical connector with the first correction device.

7. The method of claim 5, wherein the grating defines one of a square pattern, a sloped sawtooth pattern, or a sine wave pattern.

8. The method of claim 5, wherein the grating is configured to have a larger area than an area of the at least one optical port.

9. The method of claim 1, wherein the second correction device comprises a grating formed in the surface of the optical component.

10. The method of claim 9, wherein the grating defines a period based on the wavelength of a collimated light beam used to align the optical connector with the second correction device.

11. The method of claim 9, wherein the grating is configured to match a configuration of the at least one optical port, such that centering an optical fiber of the optical connector with respect to the second correction device corresponds to centering the optical fiber of the optical connector with respect to the at least one optical port.

12. The method of claim 1, wherein the optical connector comprises an array of optical fibers.

13. The method of claim 12, wherein the at least one optical port is a first optical port, the optical component further comprising a second optical port spaced from the first optical port, wherein each of the first optical port and the second optical port is associated with a first correction device and a second correction device, and wherein the optical connector comprises a first optical fiber and a second optical fiber, wherein:

aligning the optical connector with the first correction device comprises:

aligning the first optical fiber with the first correction device associated with the first optical port to achieve a first positional setting of the first optical fiber, and aligning the second optical fiber with the first correction device associated with the second optical port to achieve a first positional setting of the second optical fiber;

aligning the optical connector with the second correction device comprises:

aligning the first optical fiber with the second correction device associated with the first optical port to achieve a second positional setting of the first optical fiber, and aligning the second optical fiber with the second correction device associated with the second optical port to achieve a second positional setting of the second optical fiber; and moving the optical connector a predefined distance while maintaining the first and second positional settings of the first and second optical fibers of the optical connector to bring the optical connector into an operative position that is optimized with respect to the first and second optical ports.

14. An optical component comprising:

at least one optical port configured to receive an optical signal from an optical fiber of an optical connector;

a first correction device, wherein the first correction device is configured to align the optical fiber of the optical connector to achieve a first positional setting of the optical connector; and a second correction device, wherein the second correction device is configured to align the optical fiber of the optical connector to achieve a second positional setting of the optical connector;

wherein movement of the optical connector by a predetermined distance after achieving the first positional setting and the second positional setting and while maintaining the first and second positional settings serves to align the optical fiber of the optical connector with the at least one optical port.

15. The optical component of claim 14, wherein the first correction device is spaced from the second correction device.

16. The optical component of claim 15, wherein the at least one optical port is disposed between the first correction device and the second correction device.

17. The optical component of claim 14, wherein the optical component comprises multiple optical ports, and wherein each optical port is associated with a first correction device and a second correction device.

18. The optical component of claim 14, wherein the first correction device comprises a grating formed in a surface of the optical component, wherein the grating defines one of a square pattern, a sloped sawtooth pattern, or a sine wave pattern.

19. The optical component of claim 18, wherein the grating is configured to have a larger area than an area of the at least one optical port.

20. The optical component of claim 14, wherein the second correction device comprises a grating formed in a surface of the optical component, wherein the grating is configured to match a configuration of the at least one optical port, such that centering the optical fiber of the optical connector with respect to the second correction device corresponds to centering the optical fiber of the optical connector with respect to the at least one optical port.

* * * * *